US006245707B1

(12) United States Patent
Chu et al.

(10) Patent No.: US 6,245,707 B1
(45) Date of Patent: Jun. 12, 2001

(54) METHANOL TOLERANT CATALYST MATERIAL

(75) Inventors: Dervn Chu, Havertown, PA (US); Rongzhong Jiang, Gaithersburg, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 09/429,702

(22) Filed: Oct. 28, 1999

(51) Int. Cl.[7] ............................................ B01J 31/12
(52) U.S. Cl. ........................ 502/167; 502/162; 502/165
(58) Field of Search .................................... 502/162, 165, 502/167

(56) References Cited

U.S. PATENT DOCUMENTS

| | | | |
|---|---|---|---|
| 4,264,685 | 4/1981 | Carcia et al. | 429/40 |
| 4,290,917 | * 9/1981 | Carlson | 208/207 |
| 4,316,944 | 2/1982 | Landsman et al. | 429/44 |
| 4,420,544 | 12/1983 | Lawson et al. | 429/13 |
| 4,822,699 | 4/1989 | Wan | 429/40 |
| 5,316,900 | 5/1994 | Cooper et al. | 502/5 |
| 5,672,438 | 9/1997 | Banerjee et al. | 429/33 |
| 5,672,439 | 9/1997 | Wilkinson et al. | 429/40 |
| 5,849,428 | 12/1998 | Hamlen | 429/30 |
| 5,874,182 | 2/1999 | Wilkinson et al. | 429/30 |
| 5,876,867 | 3/1999 | Itoh et al. | 429/44 |
| 5,919,583 | 7/1999 | Grot et al. | 429/33 |
| 5,945,231 | 8/1999 | Narayanan et al. | 429/30 |

OTHER PUBLICATIONS

The Degree and Effect of Methanol Crossover in the Direct Methanol Fuel Cell, John Cruickshank and Keith Scott; Journal of Power Sources 70 (1998) 40–47, No Month.

Investigation of Methanol Crossover and Single Electrode Performance during PEMDMFC Operation A Study Using a Solid Polymer Electrolyte Memberane Fuel Cell System; A. Kuver and W. Vielstich; Journal of Power Sources 74 (1998) 211–218. No month.

The Influence of Methanol on $O_2$ Electroreduction at a Rotating Pt Disk Electrode in Acid Electrolyte, Deryn Chu and Sol Gilman, J. Electrochem. Soc, vol. 141, No. 7, Jul., 1994.

Iron Catalysts Prepared by High–Temperature Pyrolysis of tetraphenylporphyrins Adsorbed on Carbon Black for Oxygen Reduction in Polymer Electrolyte Fuel Cells; G. Faubert, R. Cote, D. Guay, J.P. Dodelet, G. Denes & P. Bertrand; Electrochimica Acta, vol. 43 Nos. 3–4, pp 341–353, 1998, No month.

Comparative Study of Methanol Crossover Across Electropolymerized and Commercial Proton Exchange Membrane Electrolytes for the Acid Direct Methanol Fuel Cell, A. Kuver and Potje–Kamloth; Electrochimica Acta, vol. 43, Nos. 16–17 pp 2527–2535 1998, No month.

* cited by examiner

Primary Examiner—Elizabeth D. Wood
(74) Attorney, Agent, or Firm—Paul S. Clohan, Jr.

(57) ABSTRACT

Methanol tolerant catalyst materials and a method of making the same are provided. These novel catalyst materials are obtained by mixing together and heat-treating at least two different transition-metal-containing nitrogen chelates. In preferred embodiments, the nitrogen chelates comprise metalloporphyrins such as transition-metal-containing tetraphenylporphins. Preferred transition metals are iron, cobalt, nickel, copper, manganese, ruthenium, vanadium, and zinc, but could be any transition metal other than platinum or palladium. These materials offer improved catalytic oxygen reduction in the presence of methanol, as may occur at a fuel cell cathode after methanol crossover.

16 Claims, 9 Drawing Sheets

M = Fe, Co, Ni, Cu, Mn, Zn, V, etc.

M = Fe, Co, Ni, Cu, Mn, Zn, V, etc.

Nano-structured Electrocatalyst

Mechanisms of Oxygen Reduction

METHANOL TOLERANT CATALYST MATERIAL

GOVERNMENT INTEREST

The invention described herein may be manufactured, used and/or licensed by or for the United States Government.

FIELD OF THE INVENTION

The present invention relates in general to catalysts useful for catalytic oxygen reduction reactions, and more particularly, to methanol tolerant electrocatalysts useful as cathode material for the electro-reduction of oxygen in direct methanol fuel cells.

BACKGROUND OF THE INVENTION

Based on rapidly expanding needs for power generation and the desire to reduce the use of hydrocarbon fuels as well as reducing polluting emissions, fuel cells are expected to fill an important role in applications such as transportation and utility power generation. Fuel cells are highly efficient devices producing very low emissions, and having a potentially renewable fuel source and fast and convenient refueling. Fuel cells convert chemical energy to electrical energy through the oxidation of fuels such as hydrogen or methanol to form water and carbon dioxide. Hydrogen fuel, however, presents serious storage and transportation problems. For these reasons, significant attention has been paid to the development of liquid fuel based fuel cells, and more particularly, to fuel cells in which methanol is fed directly to the fuel cell without any pre-treatment, i.e., direct methanol fuel cells (DMFCs).

Electrochemical fuel cells convert fuel and oxidant to electricity and reaction products. Fluid reactants are supplied to a pair of electrodes which are in contact with and separated by an electrolyte. The electrolyte may be a solid or a liquid, i.e., a supported liquid matrix. Solid electrolytes are comprised of solid ionomer or ion-exchange membrane disposed between two planar electrodes. The electrodes typically comprise an electrode substrate and an electrocatalyst layer disposed upon a major surface of the substrate. The electrode substrate typically comprises a sheet of porous, electrically conductive material, such as carbon cloth or carbon fiber paper. The electrode catalyst is typically in the form of finely comminuted metal, such as platinum, and is disposed on the surface of the electrode substrate in order to induce the desired electrochemical reaction. In a single cell, the electrodes are electronically coupled to provide a path for conducting electrons through an external load thereby producing electric current.

Direct methanol fuel cells are of particular interest over other fuel cell configurations due to a number of advantages. For example, because the methanol fuel is fed directly into the fuel cell a chemical pre-processing stage is unnecessary. In addition, bulky accessories for vaporization and humidification as in gas feed fuel cells are eliminated. Thus, direct methanol fuel cells are generally simple in construction and are suitable for many applications requiring portable power supplies.

In operation, the methanol fuel moves through the porous anode substrate and is oxidized at the anode electrocatalyst layer. At the cathode the oxidant, typically oxygen in air, moves through the porous cathode substrate and is reduced at the cathode electrocatalyst layer. In fuel cells of this type the reaction at the anode produces protons from the oxidation of methanol, as well as carbon dioxide. The anode and cathode reactions in direct methanol fuel cells are shown in the following equations:

Anode reaction: $CH_3OH + H_2O \rightarrow CO_2 + 6H^+ + 6e^-$

Cathode reaction: $O_2 + 4H^+ + 4e^- \rightarrow 2H_2O$

Overall cell reaction: $CH_3OH + 1.5\ O_2 \rightarrow CO_2 + 2H_2O$

The protons formed at the anode electrocatalyst migrate through the ion-exchange membrane from the anode to the cathode, while the electrons flow through an external load. At the cathode, the oxidant (oxygen) reacts with the protons to form water.

In these fuel cells, crossover of a reactant from one electrode to the other is undesirable. Reactant crossover may occur if the electrolyte is permeable to the reactant (methanol), i.e., some of the reactant introduced at a first electrode of the fuel cell may pass through the electrolyte to the second electrode, instead of reacting at the first electrode. Reactant crossover typically causes a decrease in both reactant utilization efficiency and fuel cell performance. Fuel cell performance is defined as the voltage output from the cell at a given current density or vice versa; the higher the voltage at a given current density or the higher the current density at a given voltage, the better the performance.

In solid polymer electrolyte direct methanol fuel cells the ion exchange membrane may be permeable to methanol, thus methanol which contacts the membrane prior to participating in the oxidation reaction can crossover to the cathode side. Diffusion of the methanol fuel from the anode to the cathode leads to a reduction in the fuel utilization efficiency and to fuel cell performance losses. Fuel efficiency utilization losses arise from methanol diffusion away from the anode because some of the methanol which would otherwise participate in the oxidation reaction at the anode and supply electrons to do work through the external circuit is lost. Methanol arriving at the cathode may be lost through vaporization into the oxidant stream, or may be oxidized at the cathode electrocatalyst, consuming oxidant (oxygen) in the process.

Methanol diffusion to the cathode also leads to a decrease in fuel cell performance. The oxidation of methanol at the cathode reduces the concentration of oxygen at the electrocatalyst and may effect access of the oxygen to the electrocatalyst because of mass transport issues. Furthermore, it has been well documented that for cathode electrocatalysts of the prior art, methanol oxidation poisons the catalytic activity of the electrocatalysts at the cathode. See, for example, Chu et al., J. Electrochem. Soc., Vol. 141, 1770–1773 (July 1994); Kuver et al., Electrochemica Acta, Vol. 43, 2527–2535 (1998); Cruickshank et al., J. Power Sources, Vol. 70, 40–47 (1998); and Kuver et al., J. Power Sources, Vol. 74, 211–218 (1998).

Several prior art patents have focused on reducing reactant crossover in electrochemical fuel cells, generally through modifications of the electrolyte membrane or the anode electrode itself. See, for example, U.S. Pat. Nos. 5,672,438; 5,672,439; 5,874,182; 5,849,428; 5,945,231; and 5,919,583. However, it has generally been found that electrolyte membranes which reduce methanol crossover also reduce fuel cell performance in that ion transfer is reduced. Essentially, a tradeoff is being made. Moreover, none of these prior art patents deal with improvements to the cathode electrocatalyst material itself in order to make the catalyst methanol tolerant.

When methanol crosses over from anode to cathode it causes two major detrimental effects on the cathode's function. First, of course, it decreases the efficiency of oxygen reduction at the cathode because the existing cathode catalysts facilitate methanol oxidation, consuming oxygen as well as leaving less reactive sites available for the oxygen reduction. Thus, a so-called "chemical short" occurs as methanol electro-oxidation occurs simultaneously with oxygen electro-reduction at the cathode. Essentially, as methanol crosses over it can be oxidized at the cathode according to the reaction:

$$CH_3OH + 1.5\ O_2 \rightarrow CO_2 + 2H_2O$$

Secondly, this reaction is generally not complete, and typically results in the production of CO. The CO produced, in turn, poisons the catalytic activity of the existing catalysts which generally comprise platinum black. Thus, for state-of-the-art cathode electrocatalysts, methanol reactivity both decreases oxygen reduction and ultimately poisons the catalyst material itself.

The present invention provides novel electrocatalysts useful for oxygen reduction while at the same time being methanol "tolerant". Being "tolerant" to methanol means that these new catalysts do not oxidize methanol and, subsequently, are not poisoned by methanol or any of its oxidation products such as CO. Any methanol which crosses over to the cathode within the fuel cell is simply vented without reaction. Thus, no "chemical short" or poisoning of the catalyst occurs. Moreover, these new catalysts have excellent oxygen reduction catalytic activity.

The state-of-the-art electrocatalysts used for the reduction of oxygen generally comprise platinum or platinum-metal alloys on a substrate of carbon powder or the like. See, for example, U.S. Pat. Nos. 4,316,944; 4,822,699; 4,264,685; and 5,876,867. In addition, metal-containing macrocyclic compounds have been investigated for a number of years as fuel cell catalysts. These metal macrocyclic compounds include $N_4$-chelate compounds, such as phthalocyanines, porphyrins, and tetraazaannulenes. See, for example, U.S. Pat. No. 5,316,990 and Faubert et al., Electrochemica Acta, Vol. 43, pp.341–353, (1998). However, these catalysts have not proven to be methanol tolerant.

The present invention provides methanol tolerant electrocatalysts, and a method of making the same, fulfilling the needs of direct methanol fuel cells. These novel catalysts are excellent oxygen reduction materials while at the same time not causing methanol oxidation or being poisoned by the presence of methanol. The catalysts have double or multiple transition metal active sites and are produced through the heat-treatment of two or more transition metal-nitrogen chelates (macrocycles); for example, tetraphenylporphine iron (III) chloride and tetraphenylporphine cobalt (II) supported on conductive carbon or graphite nanostructures. It is believed that these nanostructured electrocatalysts have di-facial configurations wherein each of the two different transition metals interacts with the same oxygen molecule to catalyze reduction.

SUMMARY OF THE INVENTION

The general objective of the present invention is to provide methanol tolerant catalysts for catalytic oxygen reduction, particularly for use in the cathode of direct methanol fuel cells. Such catalysts improve fuel cell performance when methanol crossover from the anode to cathode occurs, and are not poisoned by the presence of methanol at the cathode.

Accordingly, it is an object of the present invention to improve the performance of direct methanol fuel cells.

It is another object of the present invention to improve the utilization of oxidant (oxygen) at the cathode of direct methanol fuel cells.

It is yet another object of the present invention to provide electrocatalysts useful for catalytic oxygen reduction at the cathode in electrochemical fuel cells, more particularly direct methanol fuel cells.

It is a further object of the present invention to provide electrocatalyst materials which have high catalytic activity for the electro-reduction of oxygen and which have no catalytic activity for the oxidation of methanol.

It is a still further object of the present invention to provide electrocatalyst materials which have high catalytic activity for oxygen reduction and at the same time are methanol tolerant, i.e., neither catalyze methanol oxidation or are poisoned by the presence of methanol.

Finally, another object of the present invention is to provide a method of making the electrocatalyst materials having the foregoing properties.

In satisfaction of the foregoing objects and advantages, the present invention provides a novel family of methanol tolerant catalysts having a catalytic structure containing double or multiple, and different, transition metal active sites. These catalysts are prepared by the heat-treatment of two or more different transition metal chelates, more particularly, $N_4$-chelate compounds (macrocyclic compounds) such as metalloporphyrins.

The following and other objects and advantages of the present invention will hereafter become more fully apparent from the following detailed description. In the description, reference is made to examples and drawings which form a part hereof, and in which is shown by way of illustration, and not limitation, preferred embodiments. Such description does not represent the full extent of the invention, but rather, the invention may be employed according to the full scope and spirit of the invention as defined in the appended claims.

DETAILED DESCRIPTION OF THE PREFERRED EMBODIMENTS

Figure 1:
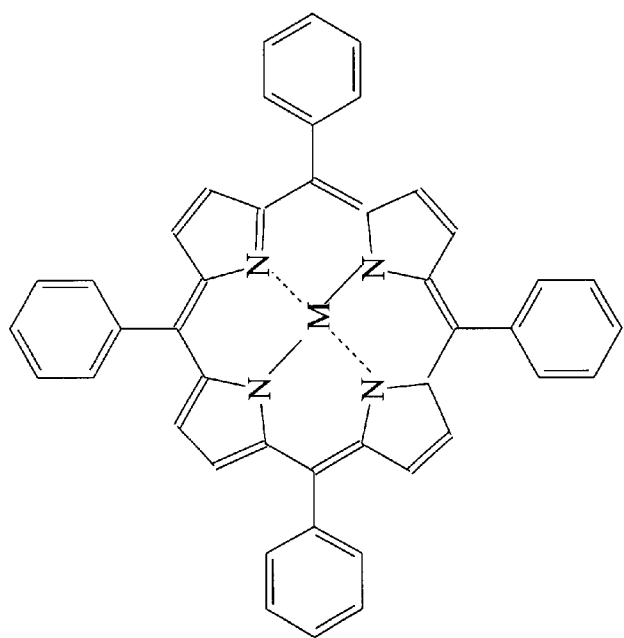
FIG. 1 shows the chemical structure of the materials used for preparation of the electrocatalysts of the present invention.

The catalysts of the present invention are compositions of matter having a structure including double or multiple catalytic active sites. These active sites consist of at least two different kinds of transition metal atoms, with the exception of platinum and palladium, which should not be used. The catalytic compounds containing these different transition metal active sites are distributed on or in conductive carbon, graphite nanostructures, or other suitable electrically conductive substrate in order to form electrodes. These new catalyst materials are very effective at catalyzing 4-electron oxygen reduction to water, while being completely inactive towards the oxidation of methanol.

These catalysts can be produced by mixing and then heat-treating two or more different kinds of transition metal chelates. In general, the transition metal chelates have the chemical formula $M_xN_yR_z$, where M represents a transition metal ion other than platinum, N is nitrogen, R is an organic group, of course, x is the number of metal atoms, y is the number of nitrogen atoms, and z is the number of R organic groups. The part of the chemical formula —$N_yR_z$ is known as an organic ligand. For example, the catalysts of the present invention may be produced by mixing and heat-treating various single metal TTP (tetraphenylporphine) compounds so that bi-metallic product is produced. TTP represents 5,10,15,20-Tetraphenyl 21H,23H-porphine, having the formula $C_{44}H_{30}N_4$. The various transition-metal containing TTP compounds may be selected from, but are not limited to, the following: (1) Fe(III)TPPCl, i.e., 5,10,15,20-Tetraphenyl-21H,23H-porphine iron (III) chloride, $C_{44}H_{28}ClFeN_4$; (2) Co(II)TPP, i.e., 5,10,15,20-Tetraphenyl-21H,23H-porphine cobalt (II), $C_{44}H_{28}CoN_4$; (3) Cu(II)TPP, i.e., 5,10,15,20-Tetraphenyl-21H,23H-porphine copper (II), $C_{44}H_{28}CuN_4$; (4) Mn(III)TPPCl, i.e., 5,10,15,20-Tetraphenyl-21H,23H-porphine manganese (III) chloride, $C_{44}H_{28}ClMnN_4$; (5) V(IV)TPPOx, i.e., 5,10,15,20-Tetraphenyl-21H,23H-porphine vanadium (IV) oxide, $C_{44}H_{28}N_4OV$; (6) Ni(II)TTP, i.e., 5,10,15,20-Tetraphenyl-21H,23H-porphine nickel (II), $C_{44}H_{28}N_4Ni$; and (7) ZnTTP, i.e., 5,10,15,20-Tetraphenyl-21H,23H-porphine zinc, $C_{44}H_{28}N_4Zn$. All of these compounds are commercially available from Aldrich Chemical Company.

The two or more transition metal chelates, which are mixed and then simultaneously heat-treated, must contain at least two different kinds of transition metal atoms, for example, $M^1_xN_yR_z$ and $M^2_xN_yR_z$ are simultaneously heat-treated where $M^1$ and $M^2$ are different transition metals. The ratio of the $M^1$ transition metal chelate to the $M^2$ transition metal chelate can vary from almost 0:1 to 1:0, without actually reaching zero for either the $M^1$ or $M^2$ chelate. That is, at least some amount, even if very small, must be present for each of the two different chelates. For example, a ratio between the two chelates varying from 0.01:0.99 to 0.99:0.01 ($M^1:M^2$) is permissible to achieve the desired effect. Although this ratio may vary between 0:1 and 1:0 ($M^1:M^2$), it is preferable to mix equal amounts of $M^1$ to $M^2$ chelates. The organic ligands can be different or the same for the two chelates being heat-treated without effecting the desired catalytic properties. Preferably, the transition metal chelates will not contain platinum, palladium, or any other material causing strong adsorption of methanol to the catalyst surface.

In general, the present catalysts are produced by mixing together and heat-treating powders of at least two different transition metal-containing chelates, said different chelates having different transition metal atoms. That is, mixing at least two powders of chemical formula $M^1_xN_yR_z$ and $M^2_xN_yR_z$, where $M^1$ and $M^2$ are different transition metals, N is nitrogen, and R is an organic ligand. The ligands, —$N_yR_z$ may be the same or they may be different for the two chelates mixed without effecting catalytic activity. The chemical structure of an example starting material is shown in FIG. 1, a transition-metal-containing TPP compound where M represents any transition metal other than platinum or palladium. In general, some of the preferred transition metals include iron, cobalt, nickel, copper, manganese, ruthenium, vanadium and zinc. Once mixed, the powders are heat-treated, preferably at 500–900° C. for carbonization or graphitization. Preferably, the heat-treatment is carried out for at least 2 hours under a protected gas atmosphere of nitrogen or argon.

Figure 2A:
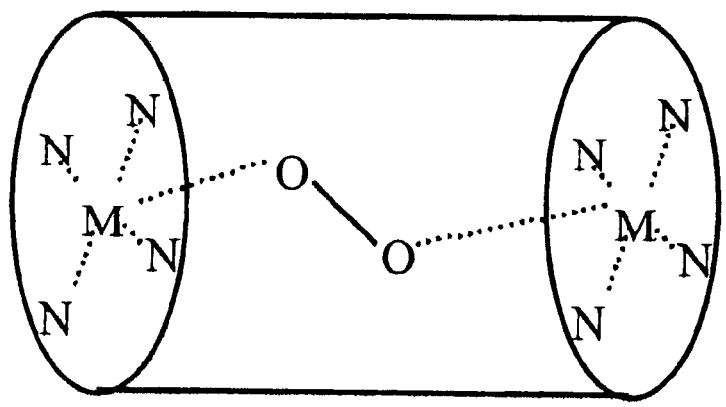
FIG. 2A is a schematic representation of the electrocatalyst of the present invention interacting with an oxygen molecule.
Figure 2B:
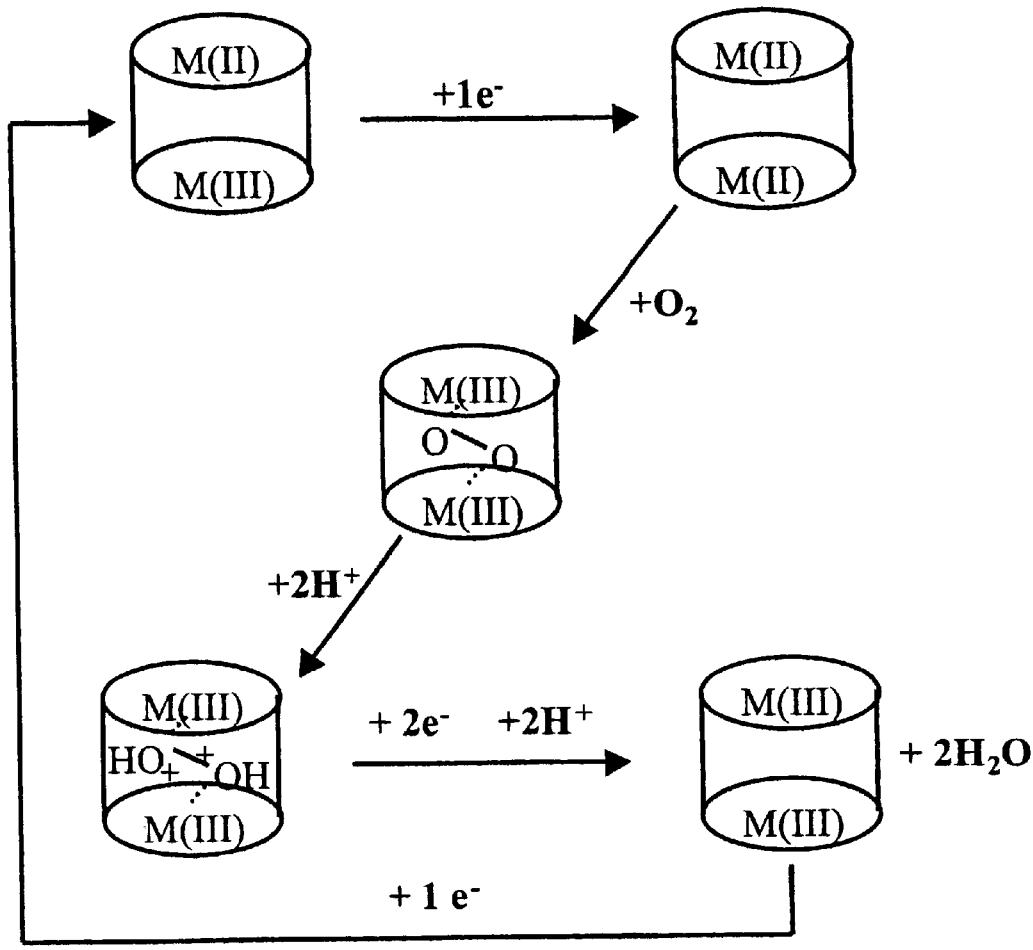
FIG. 2B is a schematic representation of a proposed mechanism for catalytic oxygen reduction by the electrocatalysts of the present invention.

The chemical structure of an example starting material is shown in FIG. 1, where M represents a transition metal selected from the group consisting of iron, cobalt, nickel, copper, manganese, ruthenium, vanadium and zinc. It is believed that after heat-treatment a di-facial nano-structured electrocatalyst is formed where both of the different transition metals M are capable of interacting with oxygen molecules to catalyze oxygen reduction, as shown in FIG. 2A. A mechanism for this catalytic oxygen reduction has been proposed, and is shown in FIG. 2B.

The electronic conductivity of the catalysts is improved by increasing the temperature for heat treatment (to reach carbonization temperatures within 500–900° C.) and also by the addition of inert conductive materials such as carbon or graphite, before or after the heat treatment. In addition, the catalytic activity (as measured by the current obtained from a fixed amount of sample) is optimized by controlling and maintaining an appropriate temperature for heat treatment, and by adjusting the ratio of metal atoms in the composition of the transition metal chelates. Generally, a 1:1 ratio of transition metals atoms in the mixture is preferred.

The catalytic activity of various catalyst materials was evaluated by electrochemical measurements, including rotating disk electrode (RDE) and cyclic voltammetry (CV). Rotating disk electrode measurements are a standard half-cell procedure well known to those of ordinary skill in the art. The powder of the various catalysts was affixed to a rotating disk electrode surface using an electrically conductive adhesive, which was inert to electrochemical reactions.

Figure 3:
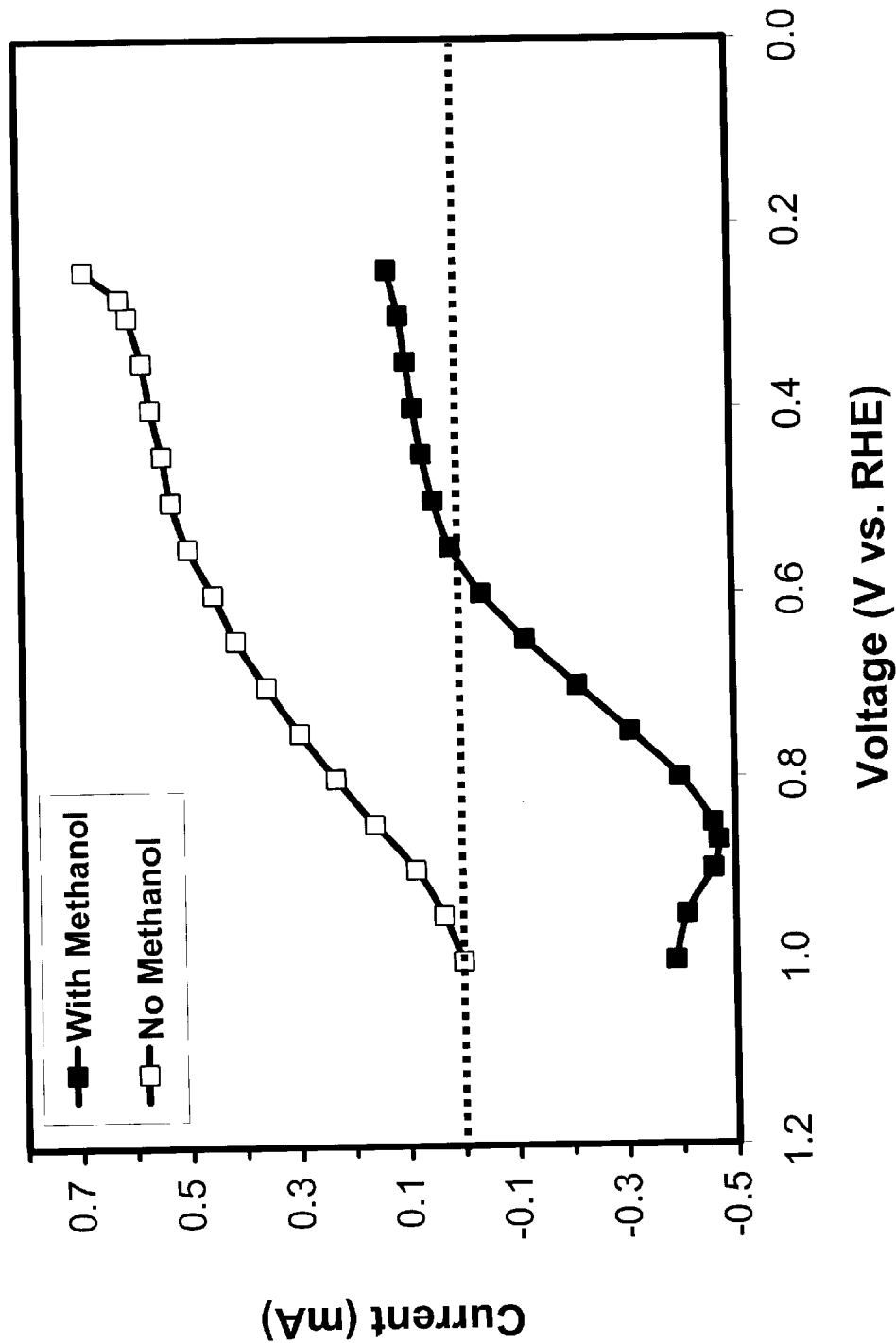
FIG. 3 is a graph showing the oxygen reduction characteristics for a platinum-black electrode of the prior art with and without the presence of methanol.

FIG. 3 shows the current-potential curves for a rotating disk platinum-black electrode of the prior art with and without methanol present. The electrolyte was oxygen saturated 0.5 molar $H_2SO_4$ with and without 1.0 molar methanol.

The scan rate was zero mV/s, the rotation rate was 400 rpm, and the electrode area was 0.2 cm$^2$. Here, the reduction current is defined as positive, and the oxidation current is defined as negative. It is clear from FIG. 3 that the Pt-black electrode (carbon substrate with Pt catalyst) shows significantly less oxygen reduction in the presence of methanol than without methanol present. Of course, with methanol present the Pt-black electrode is catalytically active for both oxygen reduction and methanol oxidation, therefore, this causes significant methanol oxidation and decreases the catalytic activity for oxygen reduction.

Figure 4:
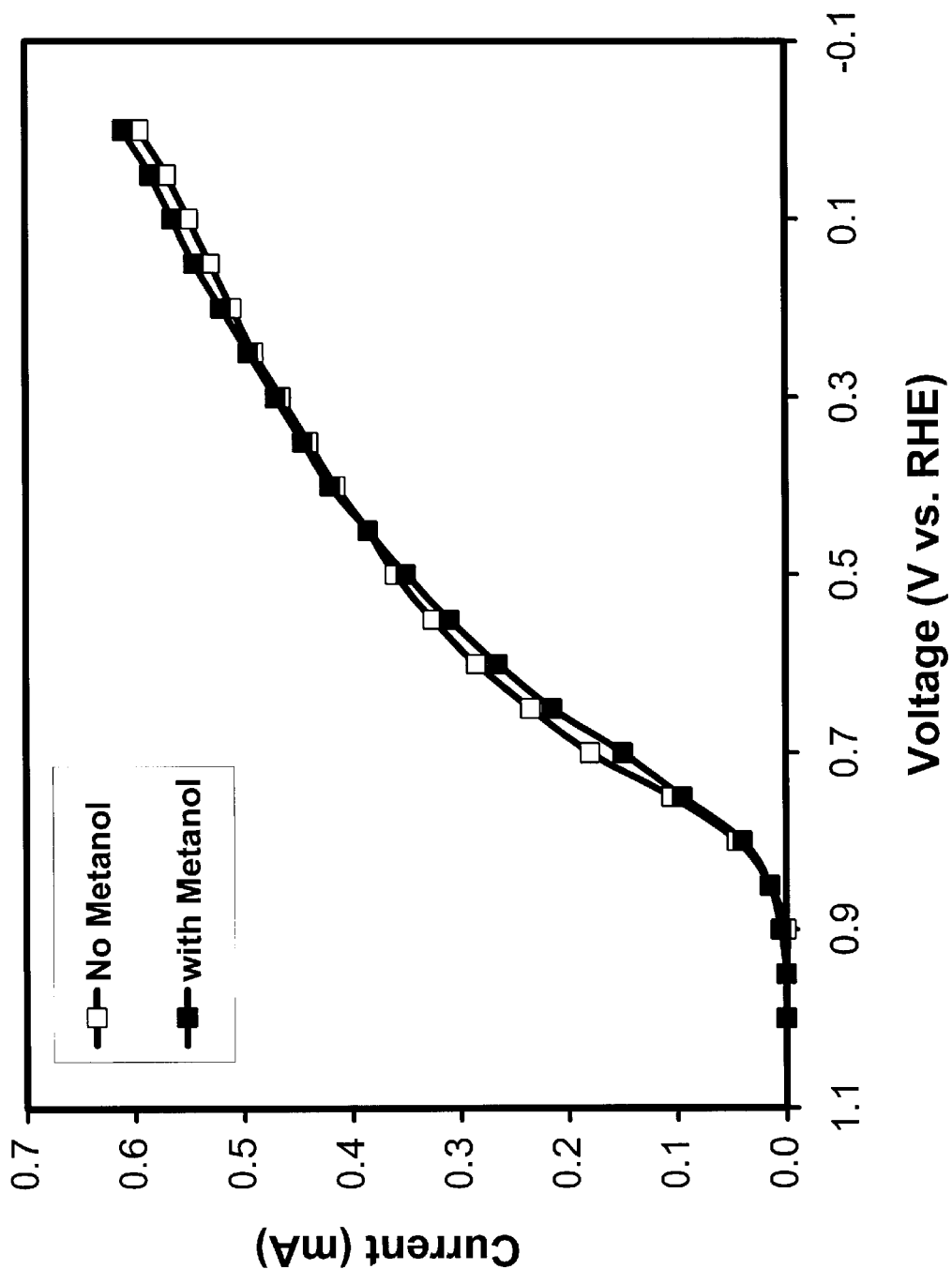
FIG. 4 is a graph showing the oxygen reduction characteristics for a heat-treated FeTTP/CoTTP electrocatalyst of the present invention with and without the presence of methanol.

FIG. 4 shows the current-potential curves for a rotating disk electrode of the present invention wherein said electrocatalyst comprises a heat-treated tetraphenylporphine iron (III) chloride and tetraphenylporphine cobalt (II) mixture, hereafter referred to as FeTTP/CoTTP. Here again, the electrolyte was O$_2$ saturated 0.5 molar H$_2$SO$_4$ containing 1.0 molar methanol, with a scan rate of zero mV/s, a rotation rate of 400 rpm, and an electrode area of 0.2 cm$^2$. In contrast to FIG. 3, FIG. 4 clearly shows that the FeTTP/CoTTP has strong catalytic activity for the catalysis of oxygen reduction (superior to Pt-black in the presence of methanol) and is unaffected by the presence of methanol. In summary, FeTTP/CoTTP has catalytic activity superior to Pt-black for oxygen reduction in the presence of methanol, and shows no catalytic activity towards methanol. Thus, the electrocatalysts of the present invention are clearly methanol tolerant, i.e., they don't interact with methanol nor are they poisoned by its presence.

The present invention will now be described below in greater detail by way of Examples, which serve to illustrate the preparation and testing of illustrative embodiments of the present invention. However, it will be understood that the present invention is in no way limited to the examples set forth below.

General Procedure

SYNTHESIS OF CATALYST: Metalloporphyrins having the general molecular structure of FIG. 1 were purchased from Aldrich Chemical Company and used as received. Different ratios of metalloporphyrins were ground and mixed together, then heat-treated in quartz tubes at different temperatures ranging from 500 to 900° C. under argon atmosphere for two hours using a type 54357 Lindburg electric tube furnace (3280 W). The product was collected, ground to fine powders and stored in vials ready for electrochemical evaluation.

ELECTROCHEMICAL EVALUATION: A conventional three compartment electrochemical cell, in which reference, counter, and working electrodes were separated, was used for evaluation of the prepared catalysts. A reversible hydrogen electrode (RHE) was used as the reference electrode. Platinum wire was used as the counter electrode. The prepared catalyst powder was affixed to a rotating disk electrode as the working electrode. In order to obtain the best attachment, conductive glue was used, made from VULCAN XC72 carbon black from Cabot Corporation. Electrolytes were prepared with distilled water and high purity sulfuric acid with different concentrations of methanol. High purity argon and oxygen were used for de-aeration of solution.

A graphite rotating disk electrode (0.2 cm$^2$), rotator, and controller were purchased from Pine Instrument. EG&G PAR 173 potentiostat and 175 Universal Programmer were used for electrochemical measurements.

A zero scan rate method was used to exclude charging current and to obtain reproducible rotating disk electrode (RDE) experimental curves from 100 to 3600 rpm, which were obtained by a series of small step potential scans.

EXAMPLE 1

Figure 5:
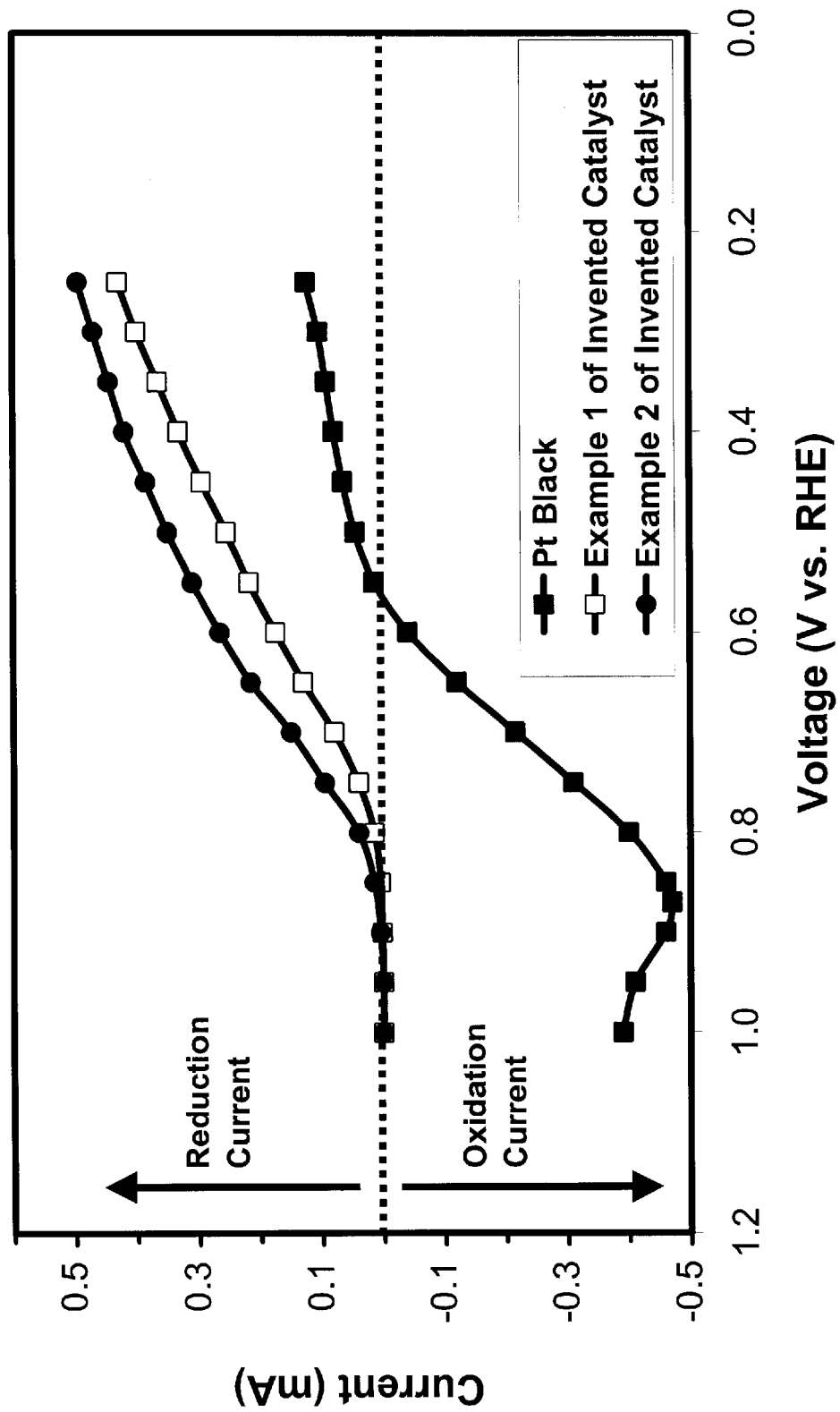
FIG. 5 is a graph comparing the oxygen reduction characteristics of Pt-black catalyst, heat-treated FeTTP/CuTTP (example 1 of the present invention) catalyst, and heat-treated FeTTP/CoTTP (example 2 of the present invention) catalyst, all in the presence of methanol.

All porphins and metalloporphyrins used in the following examples were purchased from Aldrich Chemical Company, Inc. In a first embodiment, 0.1 g of tetraphenylporphine Iron (III) chloride and 0.1 g of tetraphenylporphine Copper (II) were mixed together by ultrasonic mixing and heat-treated at 700° C. under inert gas protection for 2 hours. The product was collected and ground to fine powders. The catalytic activity of the FeTTP/CuTTP powders was evaluated by affixing the fine powders to a rotating disk electrode for electrochemical measurement. In oxygen saturated 0.5 molar H$_2$SO$_4$ solution in the presence of 1.0 molar methanol, the catalytic current for oxygen reduction began at 0.85V (vs. reversible hydrogen electrode (RHE)) and there was no sign of methanol oxidation detected, as evidenced by a lack of oxidation currents when taking cyclic voltammetry measurements. When compared to platinum black, the present FeTTP/CuTTP catalyst had a superior catalytic activity for oxygen reduction in the presence of 1.0 molar methanol conditions. These experimental results are presented as Example 1 in FIG. 5.

EXAMPLE 2

For this embodiment, 0.1 g of tetraphenylporphine Iron (III) chloride was thoroughly mixed with 0.1 g of tetraphenylporphine Cobalt (II) and heat-treated at 600° C. under inert gas protection for 2 hours. The heat-treated product was collected and ground to fine powders. The catalytic activity was evaluated by affixing the fine powders to a rotating disk electrode for electrochemical measurement. In oxygen saturated 0.5 molar H$_2$SO$_4$ solution in the presence of 1.0 molar methanol, the catalytic current for oxygen reduction began at 0.9V (vs. RHE) and again there was no evidence of methanol oxidation detected. When compared with platinum black, the present FeTTP/CoTTP catalyst had superior catalytic activity for oxygen reduction in the presence of 1.0 molar methanol conditions. These experimental results are presented as Example 2 in FIG. 5, and it should be noted that the FeTTP/CoTTP catalyst also slightly exceeded the catalytic activity of the FeTTP/CuTTP of example 1.

EXAMPLE 3

To evaluate the catalytic activity of single metal tetraphenylporphines (metal TTP), various single metal TTPs, including Fe(III)TPPCl, Co(II)TPP, Cu(II)TTP, Mn(III)TTPCl, V(IV)TPPOx, Ni(II)TPP, ZnTPP, and metal free TPP, were separately heat-treated at 700° C. under inert gas protection for 2 hours. The individual heat-treated products were collected and ground into fine powders. The catalytic activity was evaluated for each of these products, again by affixing the each of the fine powders to a rotating disk electrode for electrochemical measurement. In oxygen saturated 0.5 molar H$_2$SO$_4$ solution in the presence of 1.0 molar methanol, the catalytic current for oxygen reduction was very different for each of these materials, and was highly dependent on the transition metal coordinating to the ligand of the tetraphenylporphine. None of these single metal catalysts exhibited the catalytic activity of the multiple metal catalysts. However, on the positive side, none of them exhibited signs of methanol oxidation either. The order of catalytic activity at 0.5V (vs. RHE) was found to be Fe(III)TTPCl>V(IV)TPPOx>Co(II)TPP>Cu(II)TPP>Mn(III)

TPPCl>Ni(II)TPP>ZnTTP>TPP. At 0.7 V (vs. RHE) the order of catalytic activity was found to be V(IV)TPPOx>Co(II)TPP>Fe(III)TPPCl>Mn(III)TPPCl>Ni(II)TPP>Cu(II)TPP>ZnTPP>TPP.

EXAMPLE 4

Figure 6:
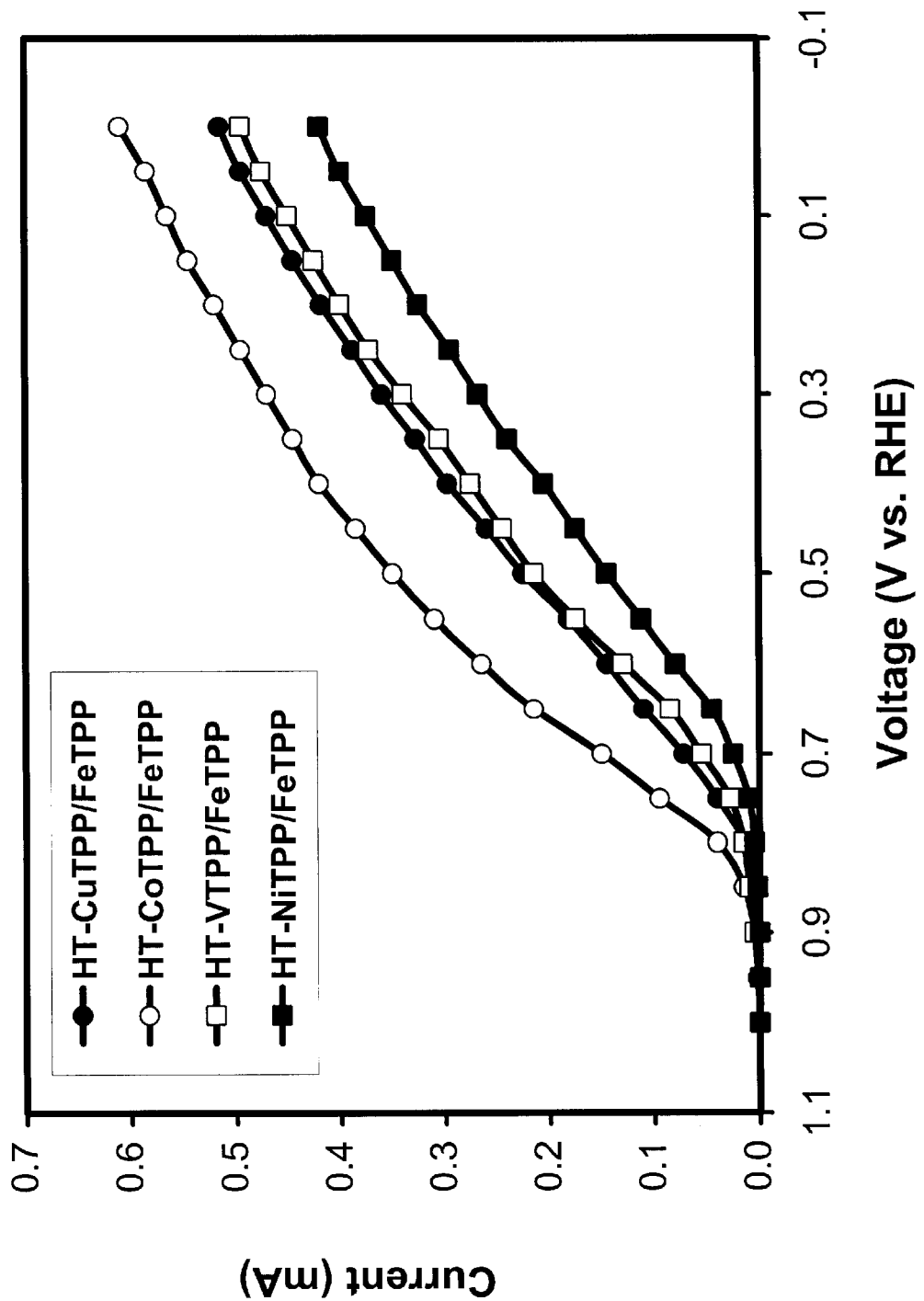
FIG. 6 is a graph showing the polarization behavior for oxygen reduction at various heat-treated binary metal-TPP coated rotating disk electrodes in $O_2$ saturated 0.5 M $H_2SO_4$ solution containing 1.0 M methanol. Rotation rate of 400 rpm, scan rate 0 mV/s, and all heat treatment at 600° C.

In order to compare the catalytic activity, various binary metal tetraphenylporphine mixtures, including Fe(III)TPPCl/Co(II)TPP, Fe(III)TPPCl/Cu(II)TPP, V(IV)TPPOx/Fe(III)TPPCl, and Ni(II)TPP/Fe(III)TPPCl were individually heat-treated at 600° C. under inert gas atmosphere for 2 hours. The products were collected and ground to fine powders. The catalytic activity was again evaluated by affixing the fine powders to a rotating disk electrode for electrochemical measurement. In oxygen saturated 0.5 molar $H_2SO_4$ solution in the presence of 1.0 molar methanol, the catalytic current for oxygen reduction varied and was highly dependent on the different transition metals coordinating to the ligand of tetraphenylporphine. However, none of these materials were found to be active for catalytic methanol oxidation. As shown in FIG. 6, the order of catalytic activity for oxygen reduction was found to be Fe(III)TPPCl/Co(II)TPP>Fe(III)TPPCl/Cu(II)TPP>Fe(III)TPPCl/V(IV)TPPOx>Fe(III)TPPCl/Ni(II)TPP throughout the entire active potential range from 0.9V to 0.0V (vs. RHE).

EXAMPLE 5

Figure 7:
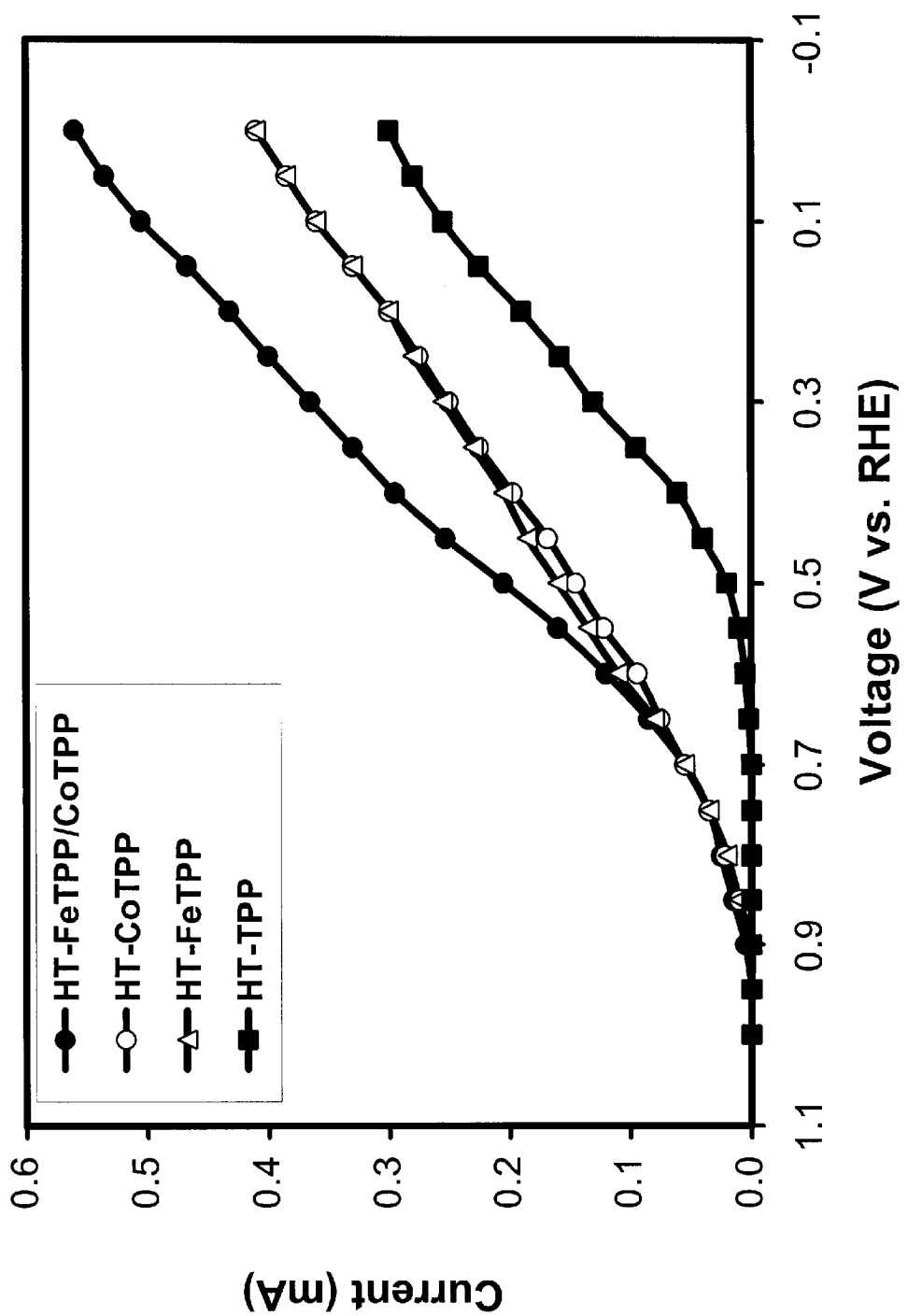
FIG. 7 is a graph showing the effect of bi-metal atom TPP (compared to single metal atom TTP) on the polarization behavior for oxygen reduction at heat-treated catalyst coated rotating disk electrodes in $O_2$ saturated 0.5 M $H_2SO_4$ solution containing 1.0 M methanol. Rotation rate 400 rpm, scan rate 0 mV/s, heat treatment at 700° C., and catalyst load 2.0 mg on electrode.

The catalytic activity of heat-treated binary metal tetraphenylporphines was compared to heat-treated monometal tetraphenylporphines. It was found that the oxygen reduction catalytic activity of heat-treated binary metal tetraphenylporphines was much higher than the catalytic activity of heat-treated mono-metal tetraphenylporphines. For example, as shown in FIG. 7, the catalytic activity of heat-treated Fe(III)TPPCl/Co(II)TPP was much higher than that of the single metal heat-treated Fe(III)TPPCl, Co(II)TPP, or TPP alone.

EXAMPLE 6

The catalytic activity of heat-treated Fe(III)TPPCl/Co(II)TPP, Fe(III)TPPCl/Cu(II)TPP, and Fe(III)TPPCl were evaluated at a rotating disk electrode in oxygen saturated 0.5 molar $H_2SO_4$ solution in the presence of 1.0 molar methanol. The results were analyzed with Koutecky-Levich equations, showing that all of these materials catalyze oxygen 4-electron reduction to water. It has generally been found that all of the present binary metal catalysts catalyze oxygen 4-electron reduction, and that iron also catalyzes 4-electron reduction as a single metal. However, cobalt only provides 2-electron reduction.

EXAMPLE 7

Figure 8:
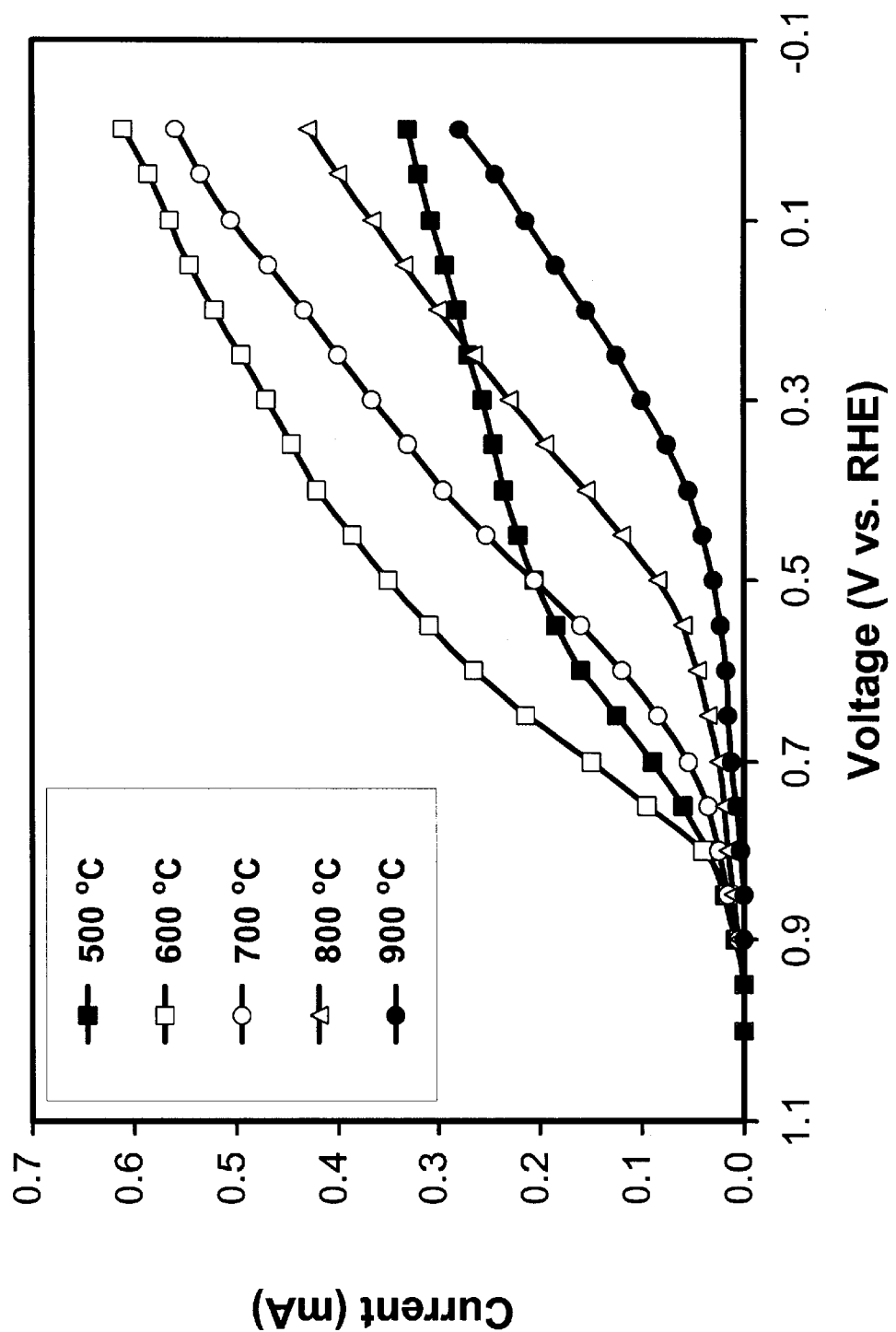
FIG. 8 is a graph showing the effect of heat-treatment temperature on the polarization behavior for oxygen reduction at heat-treated FeTPP/CoTPP coated rotating disk electrode in $O_2$ saturated 0.5 M $H_2SO_4$ solution containing 1.0 M methanol. Rotation rate 400 rpm, scan rate 0 mV/s, heat treatment temperatures ranging from 500 to 900° C., and catalyst load 2.0 mg on electrode.

In this example, the effect of the heat-treatment temperature on the catalytic activity of the catalyst compound was evaluated where the transition metals were iron and cobalt. 0.1 g tetraphenylporphine Iron (III) chloride and 0.1 g tetraphenylporphine Cobalt (II) were mixed together and heat-treated at 500° C., 600° C., 700° C., 800° C., and 900° C. under inert gas protection for 2 hours, respectively. The catalytic activity of each sample was evaluated by affixing the fine powders to a rotating disk electrode for electrochemical measurement. In oxygen saturated 0.5 molar $H_2SO_4$ solution in the presence of 1.0 molar methanol, the catalytic current for oxygen reduction began at 0.9 V (vs. RHE) and there was no sign of methanol oxidation detected. As shown in FIG. 8, the 600° C. heat-treated sample showed the highest catalytic activity for oxygen reduction in the presence of 1.0 molar methanol conditions.

EXAMPLE 8

In this example, the effect of heat-treatment temperature on catalytic activity was evaluated for catalytic compounds containing the transition metals iron and copper. 0.1 g tetraphenylporphine Iron (III) chloride and 0.1 g tetraphenyl Copper (II) were mixed together and heat-treated at 500° C., 600° C., 700° C., 800° C., and 900° C. under inert gas protection for 2 hours, respectively. The catalytic activity of each sample was evaluated by affixing the fine powders to a rotating disk electrode for electrochemical measurement. In oxygen saturated 0.5 molar $H_2SO_4$ solution in the presence of 1.0 molar methanol, the catalytic current for oxygen reduction began at 0.85V (vs. RHE) and there was no sign of methanol oxidation detected. The 700° C. heat-treated sample showed the highest catalytic activity for oxygen reduction in the presence of 1.0 molar methanol conditions.

It will be apparent to one skilled in the art that various changes, alterations, and modifications of the present invention are possible in light of the above teachings. It is therefore to be understood that while the invention has been described in this specification with some particularity, it is not intended to limit the invention to the particular embodiments provided herein. On the contrary, it is intended to cover all alternatives, modifications, and equivalents as may be included within the spirit and scope of the invention as defined in the appended claims.

What is claimed is:

1. A catalyst material comprising the product obtained by mixing together and heat-treating at least two different transition-metal-containing nitrogen chelates, wherein said at least two nitrogen chelates each contain one transition metal, said transition metals are different from one another, and said transition metals are metals other than platinum or palladium.

2. The catalyst material of claim 1, wherein said chelates comprise transition-metal-containing metalloporphyrins.

3. The catalyst material of claim 2, wherein said metalloporphyrins comprise transition-metal-containing tetraphenylporphines.

4. The catalyst material of claim 1, wherein said transition metal is selected from the group consisting of iron, cobalt, nickel, copper, manganese, ruthenium, vanadium, and zinc.

5. The catalyst material of claim 1, wherein said at least two different nitrogen chelates comprise tetraphenylporphine iron (III) chloride and tetraphenylporphine cobalt (II).

6. The catalyst material of claim 5, wherein said heat-treatment is carried out at 600° C. for about 2 hours.

7. The catalyst material of claim 1, wherein said at least two different nitrogen chelates comprise tetraphenylporphine iron (III) chloride and tetraphenylporphine copper (II).

8. The catalyst material of claim 7, wherein said heat-treatment is carried out at 700° C. for about two hours.

9. A catalyst material comprising a heat-treated mixture of at least two different transition-metal-containing nitrogen chelates, said chelates having the general formula $M^1_xN_yR_z$ and $M^2_xN_yR_z$ where $M^1$ and $M^2$ are different transition metal atoms, N is nitrogen, and R represents an organic ligand.

10. The catalyst material of claim 9, wherein said transition metals $M^1$ and $M^2$ are selected from the group consisting of iron, cobalt, nickel, copper, manganese, ruthenium, vanadium, and zinc.

11. The catalyst material of claim 9, wherein said chelates comprise transition-metal-containing metalloporphyrins.

12. The catalyst material of claim 11, wherein said metalloporphyrins comprise transition-metal-containing tetraphenylporphines.

13. A method of making catalyst material, comprising mixing together and heat-treating at least two different transition-metal-containing nitrogen chelates, said chelates each containing one transition metal other than platinum or palladium, and said transition metals being different from one another.

14. The method of claim 13, wherein said transition metals are selected from the group consisting of iron, cobalt, copper, nickel, manganese, ruthenium, vanadium, and zinc.

15. The method of claim 13, wherein said chelates comprise transition-metal-containing metalloporphyrins.

16. The method of claim 15, wherein said metalloporphyrins comprise transition-metal-containing tetraphenylporphines.

* * * * *

UNITED STATES PATENT AND TRADEMARK OFFICE
CERTIFICATE OF CORRECTION

PATENT NO. : 6,245,707 B1
DATED : June 12, 2001
INVENTOR(S) : Dervn Chu, Rongzbong Jiang Page 1 of 1

It is certified that error appears in the above-identified patent and that said Letters Patent is hereby corrected as shown below:

<u>Title page,</u>
Attorney, Agent, or Firm should read -- Paul S. Clohan, Jr.; Ulysses John Biffoni --

Signed and Sealed this

First Day of January, 2002

Attest:

JAMES E. ROGAN
*Director of the United States Patent and Trademark Office*

*Attesting Officer*